United States Patent Office 2,849,937
Patented Sept. 2, 1958

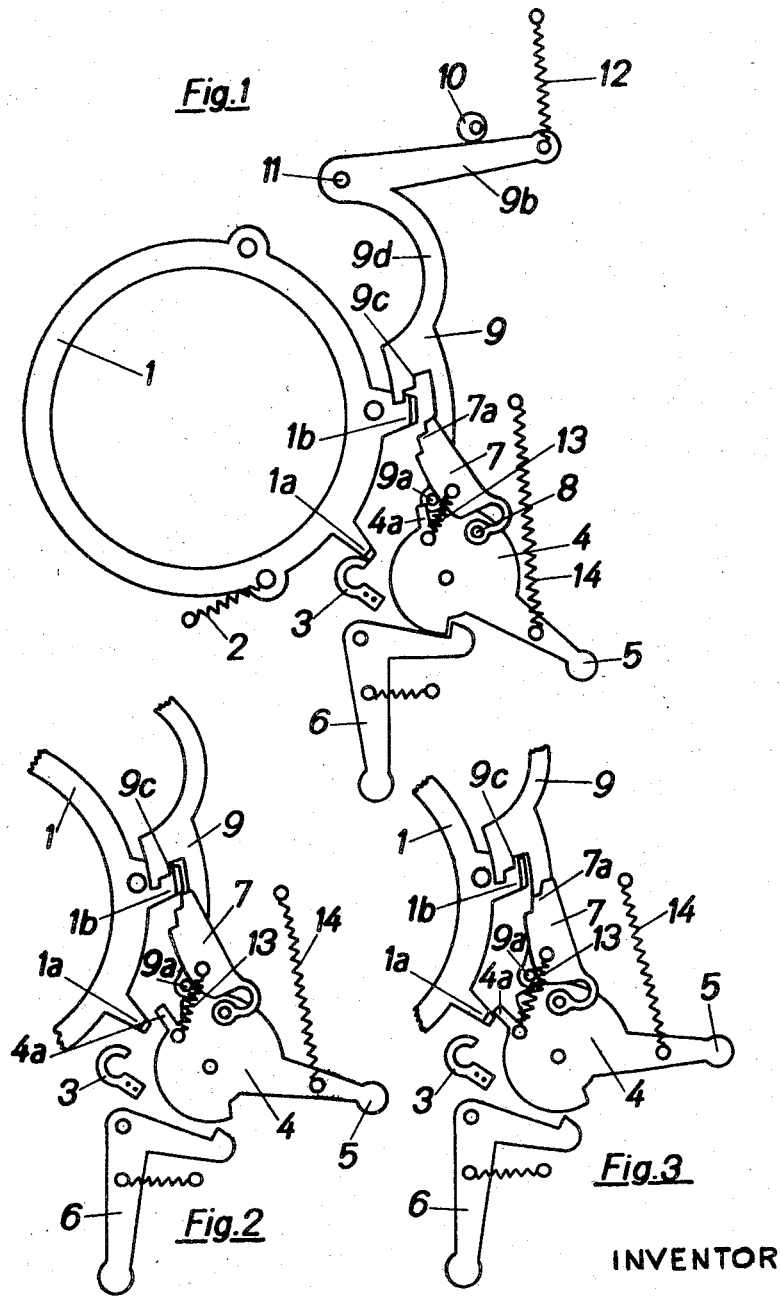

2,849,937

PHOTOGRAPHIC SHUTTER MECHANISM

Erich Burger, Munich, Germany

Application May 14, 1953, Serial No. 354,971

Claims priority, application Germany May 21, 1952

8 Claims. (Cl. 95—63)

This invention relates to a photographic shutter mechanism of the multiple sector type, and more particularly, to a linkage system for actuating said shutter in such manner as to eliminate inefficacies due to the inertia of the moving parts. Specifically, the present invention relates to an improved sector shutter operating linkage system in a plurality of elastic members which are so arranged as to actuate the shutter mechanism at high speeds without vibration or fluttering.

The present invention comprises an improvement over the shutter operating mechanism disclosed in my prior U. S. application, Serial No. 236,484, filed July 13, 1951, in which the actuating linkage was so arranged that the shutter was operated to less than full opening under the power stroke of the linkage mechanism, reliance being placed upon the power linkage and a resilient stop member to provide full shutter opening by overtravel of the driven mechanism under the effect of inertia. In the instant invention the shutter opening linkage mechanism is provided with more than one resilient or elastic member in such manner that the stresses and strain on the mechanical parts is considerably reduced whereby the life of the device is greatly increased. It has been found that this form of operating linkage further reduces vibration of the shutter sector whereby foggy and distorted images are substantially completely eliminated while retaining the exceptionally short exposure times, up to 1/1600 of a second, obtained by the construction in said prior application.

According to the instant invention the shutter sector actuating means is both driven and stopped by means of adjustable elastic projections, the driving projection being formed as a push link mounted upon a conventional shutter actuating lever, and the stopping projection being formed as an integral part of the conventional base plate. In order to provide a readily operable and stable adjustment system for changing the exposure period, the adjustable push link and stop projections are each provided with cam-like step formations for cooperation with a portion of the shutter operating ring.

A distinct feature of the present invention resides in the provision of means on the main actuating lever for cooperating with the shutter operating ring in such manner that the sector operating ring is reversed in direction of movement during a portion of the shutter opening stroke, whereby even shorter periods of exposure than heretofore have been obtained are possible.

Accordingly, a prime object of the present invention is to provide an improved sector shutter operating linkage. Another object of the invention is to provide a shutter operating linkage system for obtaining exposure periods of less than 1/1600 of a second. Other distinct objects will become apparent from the description and claims that follow.

Having broadly disclosed the invention reference will now be made to the drawings in describing a specific example of the same, and in which:

Fig. 1 diagrammatically illustrates a portion of a sector shutter linkage system in its tension condition, and when adjusted for medium exposure times, Fig. 2 illustrates the shutter linkage system in tension condition, and when adjusted for relatively long exposure times, and Fig. 3 illustrates the shutter linkage system at the time when a reversing in the direction of movement of the sector ring occurs.

In the embodiment of the invention illustrated in Figs. 1 through 3 inclusive, the sector shutter operating ring 1 is mounted for rotation in the usual manner and is normally biased in the direction of shutter closing (or return movement) by means of a weak spring 2. As shown in Fig. 1, ring 1 is in its shutter closed position, and has a stop nose 1a projecting laterally therefrom and riding against the extended end of a resilient stop projection 3. In order to actuate the shutter ring, a main actuating lever having a cam shaped disc-like portion 4 and a tensioning lever arm 5 is pivoted externally to ring 1 and adapted to rotate about its pivot for cooperation with the sector operating ring in a manner subsequently to be described by means of a tension spring 14. Normally the actuating member 4, 5 is held in its tensioned position by means of a latch or release lever 6 having a latching nose for engaging and abutting a recessed cam portion on disc portion 4, as shown in Fig. 1.

The actuating lever 4, 5 is connected with a push link 7 by means of a bearing pivot 8 carried by the disc portion 4. Push ring 7 includes an integral step-like nose portion 7a which serves as the driver mechanism for actuating the sector operating ring 1 in its sector opening direction, and a reduced, spring-like, curved portion adjacent to the pivot 8 for providing an inherent elasticity or resiliency in the link. Actuating link 7 is normally urged to rotate about its pivot 8 in a counterclockwise manner by means of a spring 13 connected between link 7 and lever portion 4, but is held against full counterclockwise movement by virtue of contact with an abutment pin 9a carried by an extension of a resilient reversing lever mechanism 9. The abutment pin 9a bears against the curved underside of link 7 in the manner illustrated, and provides a guiding surface for controlling the direction of movement of link 7 towards an actuator projection 1b, carried on shutter operating ring 1.

The reversing lever mechanism 9 includes a step-like, or cam-like, stopping portion 9c, and which is normally positioned in the path of movement of the operating projection 1b on sector ring 1. Lever 9 also includes a spring-like resilient portion 9d which is positioned between the pivot 11 of the lever and the extended end carrying abutment pin 9a and cam stop portion 9c. This arrangement provides the abutment pin and cam stop portion with an inherent elasticity or resiliency for a purpose hereinafter apparent.

The stepped cam-like portion 9c is adapted to be moved with respect to the projection nose 1b of sector ring 1 by pivoting lever 9 about its pivot pin 11, the lever 9 being provided for this purpose with an actuating arm 9b having contact with an eccentric cam member 10 by means of a biasing spring 12. The arrangement is such that spring 12 normally tends to rotate lever 9 in a counterclockwise direction about pivot 11, the limit position of the lever being controlled, however, by rotation of eccentric 10, whereby the stepped reversing cam portion 9c may be adjusted in a pre-set manner for cooperation with nose 1b of sector 1.

Actuating lever 4, 5 also carries a sector ring reversing projection 4a on the disc portion 4, which projection is adapted to contact the stop nose projection 1a on sector ring 1 (as shown in Fig. 3) upon movement of the actuating lever 4, 5 through approximately the mid-point of its shutter opening stroke.

Having described the structure of the operating linkage, reference will now be made to the same in cooperative relationship, in describing the operation of the mechanism. As shown in Fig. 1, the linkage mechanism is set in its tensioned condition with the shutter ring in its shutter closed position. By pivoting latch lever 6 in a clockwise direction, lever 4, 5 is released under the action of main spring 14 and proceeds to rotate in a counterclockwise direction (as shown in Fig. 2) to bring the step-like portion 7a of link 7 into contact with the actuating nose portion 1b to drive sector ring 1 in a counterclockwise direction against the tension of spring 2, the ring 7 being guided in its forward stroke by contact with the abutment pin 9a.

However, due to the fact that link 7 is provided with the stepped cam contour 7a, the link will always be initially positioned with a slight clearance between it and ring nose projection 1b so that the link may be greatly accelerated before striking the ring nose projection. This arrangement substantially shortens the actual shutter opening operation and is a main factor in eliminating vibration, the elastic, bow-like portion of link 7 providing a cushioning action without substantially detracting from the rapid acceleration provided. It will be apparent that this construction also serves to permit the obtaining of shorter exposure periods.

Continued rotation of the main actuating lever will cause actuating link 7 to rotate about pivot 8 and against the tension of spring 13 in the manner illustrated in Fig. 3 to move the nose portion 7a out of the path of the ring nose portion 1b. Simultaneously nose portion 1b contacts on the surface of reversing cam portions 9c of lever 9 to substantially stop shutter ring 1 in its shutter opening movement. However, due to the inherent resiliency of lever 9, through the intermediate of the bow-like structure 9d, reversing projections 9c do not constitute a full and positive stop to the continued forward movement of ring 1. The ring thus continues to or in (depending on the setting of lever 9) its full shutter opening movement under the influence of its own inertia.

Subsequently, the ring inertia is overcome and the energy stored in the flexed bow-like portion 9d of lever 9 causes a reversing in the direction of movement of the shutter ring to return it in a shutter closing direction. At approximately this instant, the reversing projection 4a on main actuating lever 4, 5 comes into contact with projection 1a on sector ring (as illustrated in Fig. 3) and positively drives the sector operating ring in a shutter close direction, i. e., in a clockwise direction, the weak return spring 2 assisting projection 4a and the stored energy in resilient reverse lever 9 in this action. It will be realized, of course, that the above description of the operation of the linkage with reference to Figs. 1, 2 and 3 is merely exemplary since the illustrations of Figs. 1, 2 and 3 depict the linkage structure when adjusted for different exposure times.

Adjustment of the exposure period is readily provided by rotating the cam 10 to cause lever 9 to rotate in a clockwise direction about pivot 11 and bring the step-like projection 9c into a different alignment with the operating nose portion 1b of ring 1. Simultaneously with adjustment of lever 9, the abutment pin 9a will be adjusted with respect to actuating link 7, and by virtue of the curved edge contacting surface link 7, will cause such link to rotate either clockwise or counterclockwise about pivot 8 under the influence of pin 13 to alter the position of actuating nose 7a with respect to the sector ring operating nose portion 1b in like manner to the movement of reversing cam projections 9c. It will thus be apparent that various exposure periods may be provided for by a suitable choice of step-like projections 7a and 9c on the respective members.

It will also be obvious that further adjustments may be provided by mounting the anchor pin for the main tensioning spring 14 of the actuating lever 4, 5 on a suitable adjustable base, as for example, on a lever actuated by means of a cam-bearing timing ring as set forth in said prior application. For this purpose the latch lever 6 may be provided with a plurality of step-like latch projections for cooperating with the notch on disc portion 4 in any one of the pre-set positions of lever 4, 5 and spring 14. With such constructions it will be apparent that not only will the step-like projections 9c and 7a be adjusted with respect to the ring projection 1b through the rotaion of eccentric 10, but that the step-like cam nose 7a of link 7 may be further manipulated to provide an additional change in the exposure time. Such an arrangement makes it possible to use the control of step-like cam portions 9c and 7a by lever 9 as a rough setting, while adjustment of lever 4, 5 and spring 14 may serve as a fine setting.

As many apparently widely different embodiments of this invention may be made without departing from the spirit and scope hereof, it is to be understood that the invention is not limited, except as defined in the appended claims.

What is claimed is:

1. A photographic lens shutter mechanism comprising a shutter operating ring, projecting means mounted upon said ring, actuating means for driving said ring in a direction to open said shutter, movable means mounting said actuating means to move into contact with said projecting means for driving said ring in a shutter-opening movement, reversing means disposed in the path of movement of said projecting means for driving said ring in a shutter-closing movement, elastic means incorporated in said reversing means to permit said ring to continue in its shutter-opening movement after contacting said reversing means before said reversing means initiates said shutter-closing movement, and control means operatively engaged with said actuating means and with said reversing means for varying the force imparted to said projecting means by said actuating means and the amount of travel of said projecting means before it contacts said reversing means, said control means increasing said force to provide higher shutter speeds with concomitant earlier contact with said reversing means to maintain said aperture opening substantially constant over the entire range of shutter speeds.

2. A photographic lens shutter mechanism as set forth in claim 1 wherein said actuating means is comprised of an arm pivotally mounted upon a rotatable member, spring means is attached to said rotatable member to resiliently urge it in a direction to cause said arm to contact said projecting means, and latch means is operatively associated with said rotatable member to hold it against the force of said spring in a cocked position.

3. A photographic lens shutter mechanism as set forth in claim 2 wherein said arm includes a resilient portion for minimizing the shock imparted to said shutter.

4. A photographic lens shutter mechanism as set forth in claim 2 wherein said reversing means includes a reversing lever, said arm and said lever including reversely stepped contacting surfaces for engaging said projecting means, said control means being operatively associated with said reversing lever for aligning a predetermined step with said projecting means, and said reversing lever being operatively engaged with said arm to align reversely corresponding steps of said reversing lever and said arm with said projecting means to cause said reversing lever to contact said projecting means earlier as said projecting means is driven with greater force by more highly accelerated steps positioned more remotely from said projecting means to maintain said aperture opening constant over said entire range of shutter speeds.

5. A photographic lens shutter mechanism as set forth in claim 2 wherein said reversing means includes an extension disposed upon said rotatable member and a corresponding extension upon said sector operating ring which contact each other to react upon said spring means to aid in resiliently causing a shutter-closing movement of said ring.

6. A photographic lens shutter mechanism as set forth in claim 4 wherein said arm slides against a pin mounted upon said reversing lever to properly align said steps.

7. A photographic lens shutter mechanism as set forth in claim 1 wherein a weak return spring is operatively coupled to said ring.

8. A photographic lens shutter mechanism as set forth in claim 4 wherein an eccentric is operatively engaged with said lever to vary said alignment of said lever and said arm.

References Cited in the file of this patent

UNITED STATES PATENTS

| | | |
|---|---|---|
| 798,595 | Bruek | Sept. 5, 1905 |
| 1,435,999 | Wollensak et al. | Nov. 21, 1922 |
| 1,629,534 | Riddell | May 24, 1927 |
| 1,754,202 | Riddell | Apr. 8, 1930 |
| 1,941,292 | Deckel et al. | Dec. 26, 1933 |
| 1,963,324 | Deckel et al. | June 19, 1934 |